US006296463B1

(12) United States Patent
Allen

(10) Patent No.: US 6,296,463 B1
(45) **Date of Patent: *Oct. 2, 2001**

(54) SEGMENTED METERING DIE FOR HOT MELT ADHESIVES OR OTHER POLYMER MELTS

(75) Inventor: Martin A. Allen, Dawsonville, GA (US)

(73) Assignee: Nordson Corporation, Westlake, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/141,959

(22) Filed: Aug. 28, 1998

Related U.S. Application Data

(63) Continuation-in-part of application No. 09/063,651, filed on Apr. 20, 1998, now abandoned.

(51) Int. Cl.$^{7}$ .......................... B29C 47/10; B29C 47/12

(52) U.S. Cl. .......................... 425/7; 118/315; 156/500; 425/72.2; 425/192 S

(58) Field of Search .......................... 425/7, 72.2, 81.1, 425/83.1, 186, 192 S; 118/315; 156/167, 500

(56) References Cited

U.S. PATENT DOCUMENTS

| | | | |
|---|---|---|---|
| 3,849,241 | 11/1974 | Butin et al. . | |
| 4,073,850 | 2/1978 | Brackman et al. . | |
| 4,478,624 | 10/1984 | Battigelli et al. . | |
| 4,526,733 | 7/1985 | Lau | 264/12 |
| 4,687,137 | 8/1987 | Boger et al. . | |
| 4,708,619 | 11/1987 | Balk | 425/141 |
| 4,785,996 | 11/1988 | Ziecker et al. . | |
| 4,815,660 | 3/1989 | Boger . | |
| 4,891,249 | 1/1990 | McIntyre . | |
| 4,983,109 | 1/1991 | Miller et al. | 425/7 |
| 5,145,689 | 9/1992 | Allen et al. | 425/72.2 |
| 5,236,641 | 8/1993 | Allen et al. | 264/40 |
| 5,382,312 | 1/1995 | Raterman . | |
| 5,445,674 * | 8/1995 | DeMars | 118/315 |
| 5,605,720 | 2/1997 | Allen et al. | 427/288 |
| 5,618,566 * | 4/1997 | Allen et al. | 425/7 |
| 5,679,319 | 10/1997 | Fabbricante et al. | 425/7 |
| 5,683,752 | 11/1997 | Popp et al. | 427/421 |
| 5,728,219 * | 3/1998 | Allen et al. | 425/72.2 |

FOREIGN PATENT DOCUMENTS

| | | |
|---|---|---|
| 68534594.6 | 12/1985 | (DE) . |
| 0820817 | 1/1988 | (EP) . |
| WO 94/01221 | 1/1994 | (WO) . |

OTHER PUBLICATIONS

Trends (1993) The CF 800 Metered Head.

* cited by examiner

*Primary Examiner*—Nam Nguyen
*Assistant Examiner*—Joseph Leyson
(74) *Attorney, Agent, or Firm*—Wood, Herron & Evans, L.L.P.

(57) ABSTRACT

A segmented die assembly comprising a plurality of side-by-side and separate units. Each die unit includes (a) a manifold segment having an internal gear pump, (b) a die module mounted on the manifold segment, and (c) a recirculating module mounted on the manifold segment. The manifold segments are interconnected and function to deliver process air and polymer melt to the modules. Each die module includes (a) a fiberization nozzle, and (b) a valve for controlling the flow of polymer therethrough. The gear pump of each manifold segment receives a polymer melt and delivers it either to the die module (with its valve open) or to the recirculation module (with the die module valve closed). Polymer melt flowing through the die module and is discharged as a filament or filaments onto a moving substrate or collector. On the other hand, polymer flow through the recirculation module is returned to the polymer melt hopper or reservoir for recirculation through the die assembly.

17 Claims, 9 Drawing Sheets

SEGMENTED METERING DIE FOR HOT MELT ADHESIVES OR OTHER POLYMER MELTS

RELATED APPLICATION

This application is a continuation-in-part of Application Ser. No. 09/063,651, filed Apr. 20, 1998 (now abandoned), the disclosure of which is hereby fully incorporated by reference herein.

BACKGROUND OF THE INVENTION

This invention relates generally to fiberization dies for applying hot melt adhesives to a substrate or for producing nonwovens. In one aspect the invention relates to a modular die provided with an internal rotary positive displacement pump. In another aspect, the invention relates to a segmented die assembly comprising a plurality of separate die units, each unit including a manifold segment and a die module and recirculation module mounted thereon.

The deposition of hot melt adhesives onto substrates by fiberization dies has been used in a variety of applications including diapers, sanitary napkins, surgical drapes, and the like. This technology has evolved from the application of linear beads such as that disclosed in U.S. Pat. No. 4,687,137, to air-assisted deposition such as that disclosed in U.S. Pat. No. 4,891,249, to spiral deposition such as that disclosed in U.S. Pat. Nos. 4,949,668 and 4,983,109. More recently, meltblowing dies have been adapted for the application of hot melt adhesives (see U.S. Pat. No. 5,145,689). As the term suggests, "fiberization" refers to a process wherein a thermoplastic melt is extruded into and set into fibers.

Modular dies have been developed to provide the user with flexibility in selecting the effective length of the fiberization die. For short die lengths only a few modules need be mounted on a manifold block. (See U.S. Pat. No. 5,618,566). Longer dies can be achieved by adding more modules to the manifold. U.S. Pat. No. 5,728,219 teaches that the modules may be provided with different types of die tips or nozzles to permit the selection of not only the die length but the deposition pattern.

U.S. Pat. No. 5,236,641 discloses a metering die which comprises a plurality of metering pumps which feed polymer to individual regions of a single elongated die tip. The tip is mounted on a single polymer manifold which has a plurality of side-by-side flow channels which feed a predetermined number of orifices of the tip. Each pump supplies polymer to a single channel. The pumps may be turned on or off so that polymer flow may be discontinued to some of the orifices of the integral elongate tip. In this design the length of the die is not variable because the manifold and die tip are of fixed length and are not formed from individual segments.

At the present, the most commonly used adhesive fiberization dies are intermittently operated air-assisted dies. These include meltblowing dies, spiral nozzles, and spray nozzles.

Meltblowing is a process in which high velocity hot air (normally referred to as "primary air" or "process air") is used to blow molten fibers or filaments extruded from a die onto a collector to form a nonwoven web or onto a substrate to form an adhesive pattern, a coating, or composite. The terms "primary air" and "process air" are used interchangeably herein. The process employs a die provided with (a) a plurality of openings (e.g. orifices) formed in the apex of a triangular shaped die tip and (b) flanking air plates which define converging air passages. As extruded rows of the polymer melt emerge from the openings as filaments, the converging high velocity hot air from the air passages contacts the filaments and by drag forces stretches and draws them down forming microsized filaments. In some meltblowing dies, the openings are in the form of slots. In either design, the die tips are adapted to form a row of filaments which upon contact with the converging sheets of hot air are carried to and deposited on a collector or a substrate in a random pattern.

Meltblowing technology was originally developed for producing nonwoven fabrics but recently has been utilized in the meltblowing of adhesives onto substrates. Meltblown filaments may be continuous or discontinuous.

Another type of die head is a spiral spray nozzle. Spiral spray nozzles, such as those described in U.S. Pat. Nos. 4,949,668 and 5,102,484, operate on the principle of a thermoplastic adhesive filament being extruded through a nozzle while a plurality of hot air jets are angularly directed onto the extruded filament to impart a circular or spiral motion thereto. The filaments thus form an expanding swirling cone shape pattern while moving from the extrusion nozzle to the substrate. As the substrate moves with respect to the nozzle, a circular or spiral or helical bead is continuously deposited on the substrate, each circular cycle being displaced from the previous cycle by a small amount in the direction of substrate movement. The meltblowing die tips offer superior coverage whereas the spiral nozzles provide better edge control.

Other fiberization dies include the older non-air-assisted bead nozzles such as bead nozzles and coating nozzles.

SUMMARY OF THE INVENTION

The die assembly of the present invention may be viewed as a fiberization device for processing a thermoplastic material into fibers or filaments. (The terms "fibers" and "filaments" are used interchangeably herein.) The fiberization may be air-assisted as in meltblowing, spiral monofilaments, or melt spraying; or may be non-air-assisted as in bead or coating depositions.

The fiberization of hot melt adhesives is the preferred use of the die assembly of the present invention; but as will be recognized by those skilled in the art, it can be used in the meltblowing of polymers to form nonwoven webs.

The die assembly of the present invention features a number of novel features, but in a broad embodiment, it comprises three main components: a manifold segment; a fiberization die module; and a recirculation module. The manifold, in a preferred embodiment, includes an internal rotary positive displacement pump (e.g. gear pump) for receiving a polymer melt from a polymer delivering system (e.g. extruder) and discharging the same at a metered rate (constant rate) to one of the modules. Each module includes a valve for controlling the flow of the polymer melt therethrough. Controls are provided so that the flow from the gear pump is uninterrupted; that is, the pump discharge flows either to the fiberization die module or the recirculation module. This is achieved by selectively activating the valves of the fiberization die module and the recirculating module. Generally, the flow will be to one or the other module, but not both.

The preferred embodiment of the invention contemplates the use of a plurality of the manifold segments (with each having the two modules described above mounted thereon), interconnected in a side-by-side relationship. The number of segment/module units define the effective length of the die assembly. The side-by-side fiberization die modules form a row of nozzles (e.g. meltblowing die tips, spiral nozzles, etc.) for generating the fibers (or filaments) and depositing the same onto a substrate or collector. The driven rotary member of each internal gear pump rotates about an axis generally parallel to the row of nozzles. In a preferred embodiment, a motor driven shaft extends through the side-by-side manifold segments along this axis of rotation and is keyed to each driven rotary member. Thus, only one driven shaft is required for the entire assembly.

An alternate embodiment of the present segmented die includes a self-contained modular rotary pump in each segment, and wherein each pump comprises metering gears and a segmented drive shaft. The drive shaft of each pump has a tang at one end and a slot at the opposite end. In the assembled configuration, the tang of one pump shaft couples with the slot of the adjacent pump. The tang of the adjacent pump will couple with the slot of the pump adjacent to it; and so on along the die length. Thus in the modular pump embodiment, the integral drive shaft whereon all the driven pump gears are mounted is replaced with coupled drive shaft segments. This embodiment has the advantage that die segments may be removed or added without the need for disassembling the manifold, as well as eliminating the need for using integral drive shafts of various lengths to accommodate additional segments and pumps. The modular pumps may also be preassembled and rapidly installed into the die manifold.

In summary, the die assembly of the present invention comprises the following novel features:

(a) a die with an internal metering pump;

(b) a die with a fiberization die module and a recirculation module, and means for selecting the flow through each module;

(c) a plurality of manifold segments, each segment having an internal metering pump;

(d) a plurality of side-by-side manifold segments having internal metering pumps driven by a single shaft or a segmented shaft; and (e) a plurality of side-by-side manifold segments, each having a fiberization die module and a recirculation module, and means for selectively controlling the polymer melt flow to either module of each manifold/module unit.

DESCRIPTION OF THE PREFERRED EMBODIMENTS

Figure 1:
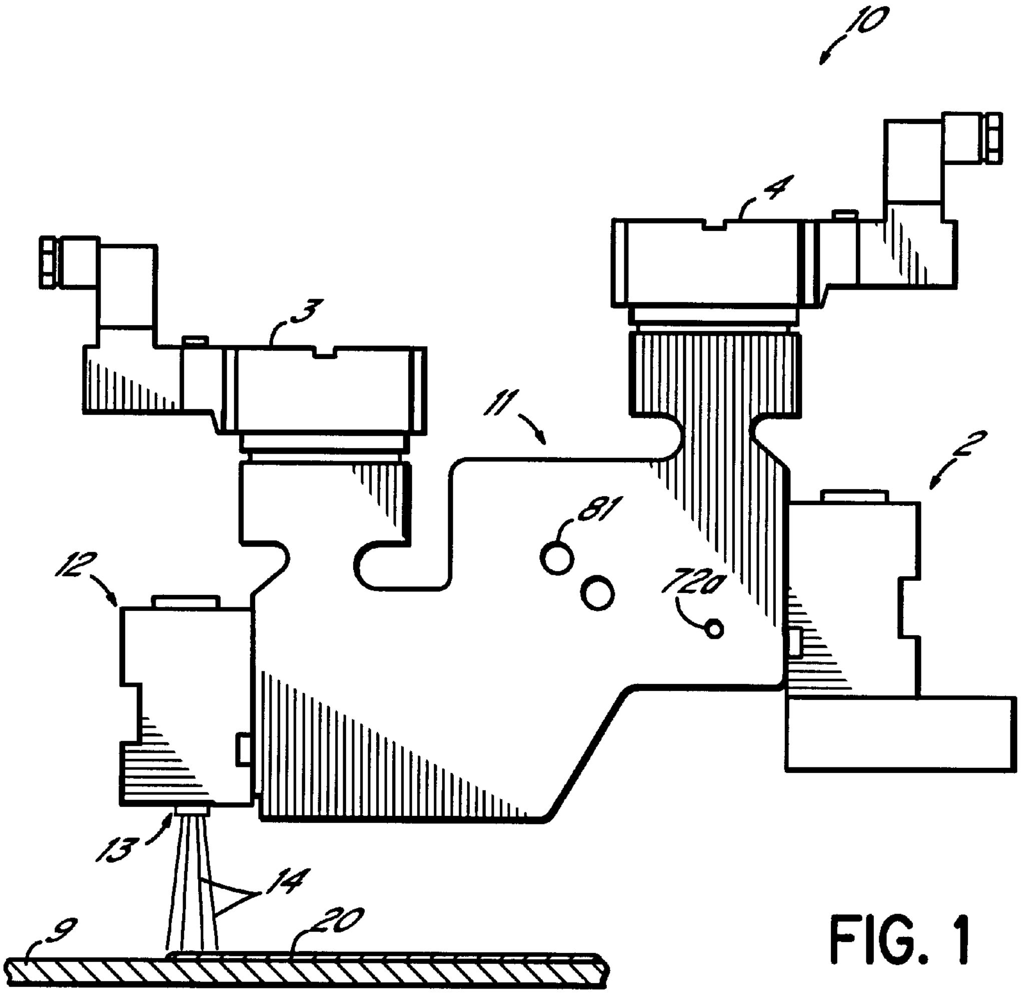
FIG. 1 is a side elevational view of the present segmented die.

As seen in FIG. 1, die assembly 10 comprises segmented manifold 11 (or die), fiberization die modules 12, recirculation modules 2, and pneumatic controllers 3 and 4. Manifold 11 supplies a pressurized molten polymer to module 12. Die module 12 has a die tip 13 through which a molten polymer is extruded to form a stream of polymer fibers or filaments 14 which are deposited on a moving collector or substrate 9 to form a continuous or discontinuous layer 20. Filaments 14 may be in the form of continuous or discontinuous filaments as in meltblowing, or beads, sheets, or spirals as in the application of adhesives.

Figure 2:
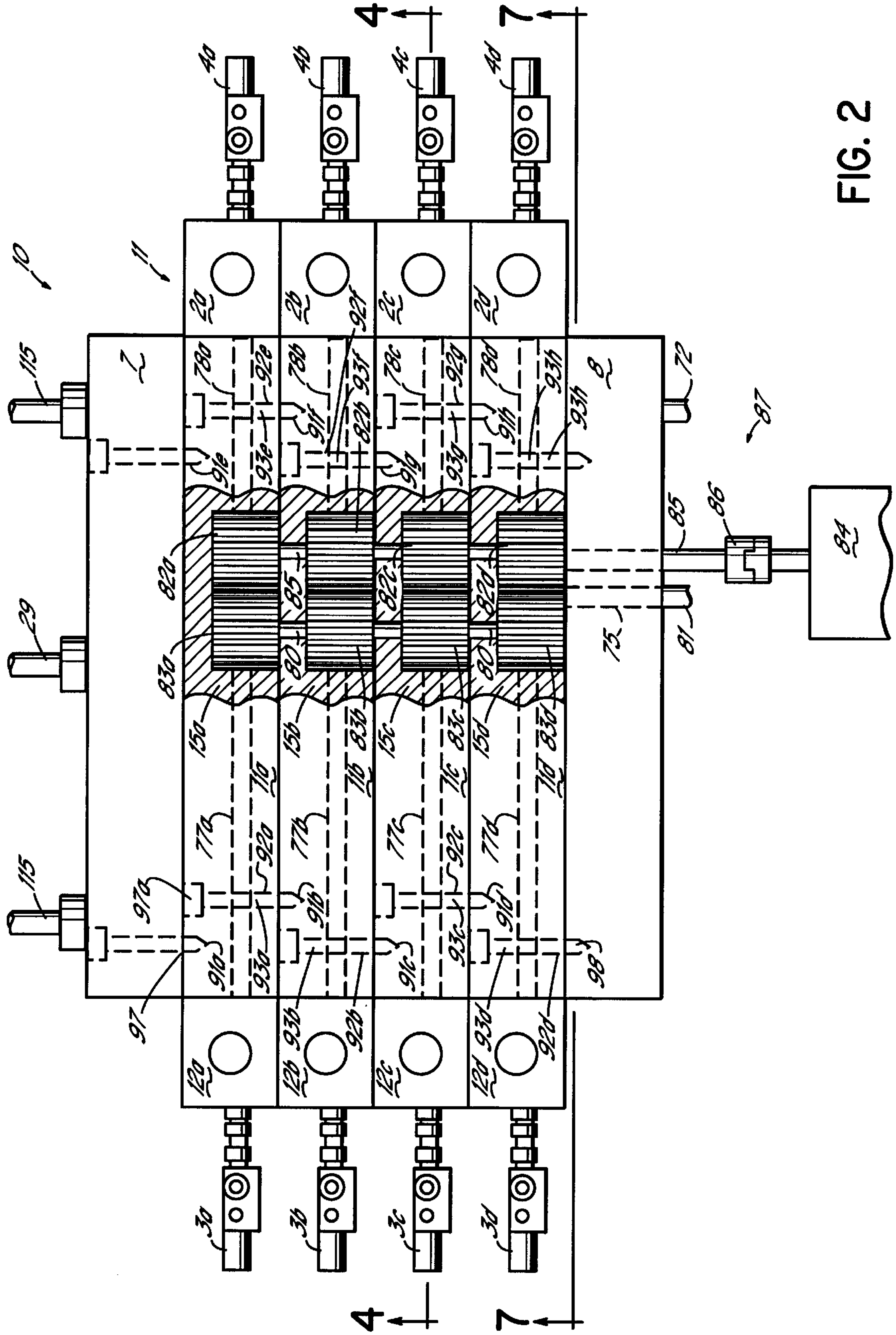
FIG. 2 is a top plan view, with portions cut away, of the die illustrating die segments, gear pumps, and polymer flow passages.
Figure 3:
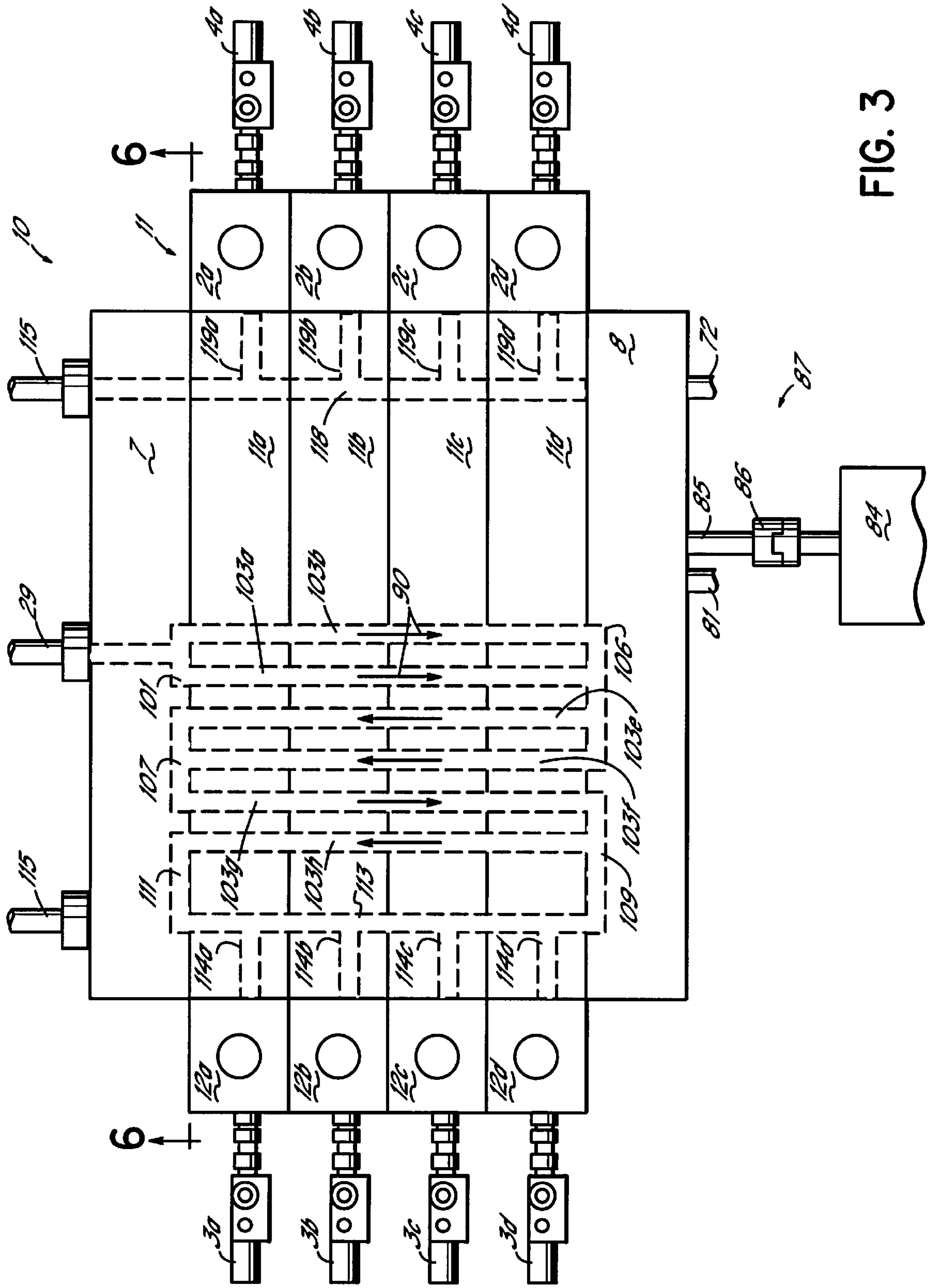
FIG. 3 is a top plan view illustrating the process and instrument air flow passages.

As seen in FIGS. 2 and 3, manifold 11 is of segmented design comprising a number of separate segments 11*a*–*d* interconnected in side-by-side relationship and sealed at each end by endplates 7 and 8.

Since the segments 11*a*–11*d* are substantially identical in structure, reference numerals without lower case letters will represent corresponding parts in each segment. In describing the assembly, reference numerals with lower case letters (e.g. 11*a*–11*d*) will represent the corresponding parts of the assembly.

General Description

Each segment 11*a*–11*d* contains rotary positive displacement pump 15*a*–15*d* and associated flow passages which feed molten polymer to die modules 12*a*–*d* in parallel and are discharged therefrom as filaments 14. The manifold segments 11*a*–*d* also contain flow passages which feed polymer from pumps 15*a*–*d* to recirculation modules 2*a*–*d*. Pneumatic controls 3*a*–*d* and 4*a*–*d* activate valves within modules 12*a*–*d* and 2*a*–*d* which can be selectively and individually opened or closed to control the flow of polymer to either module. In the operational mode, the controls of an individual segment will activate the valves which route the flow of polymer to the die module 12 and there will be flow to the recirculation module 2. In the by-pass or recirculation mode the controls route the polymer to the recirculation module 2 where the polymer is recirculated to a polymer supply reservoir (not shown) and no polymer is discharged from the die module 12. By controlling which of segments 11 *a*–*d* are in the operational mode or in the recirculation mode, different patterns of polymer may be discharged from the die modules.

Rotary pumps 15*a*–*d* act as metering pumps which when in the operational mode will deliver polymer to each die module 12 at substantially the same rate. The variation in polymer flow rate from module to module will typically be less than 5% thus providing excellent uniformity along the die length. The rotary pumps 15*a*–15*d* are preferably gear pumps that provide a constant output for a given rpm.

One feature of the segmented design is that segments may be added or removed to vary the die length from application to application.

As described below, in a preferred embodiment, the fiberization module 12 is provided with an air-assisted nozzle (e.g. meltblowing, spray, or spiral). End plate 7 has process air inlet 29 which feeds air passages formed in manifold 11. The air flows through manifold 11 and is delivered to the die modules 12*a–d* in a parallel flow pattern. The process air assists in the formation of filaments 14 as will be described.

Each of the main components and functions of the segmented manifold with internal metering pumps, die module, recirculation module, and controllers of the die assembly 10 are described in detail below.

Die Modules

The preferred die modules 12 for fiberizing the polymer melt are the type described in U.S. Pat. Nos. 5,618,566 and 5,728,219, the disclosures of which are incorporated herein by reference. It should be understood, however, that other die modules may be used. See, for example, U.S. patent application Ser. No. 09/021,426, filed Feb. 10, 1998, entitled "MODULAR DIE WITH QUICK CHANGE DIE TIP OR NOZZLE," now U.S. Pat. No. 6,210,141.

Figure 4:
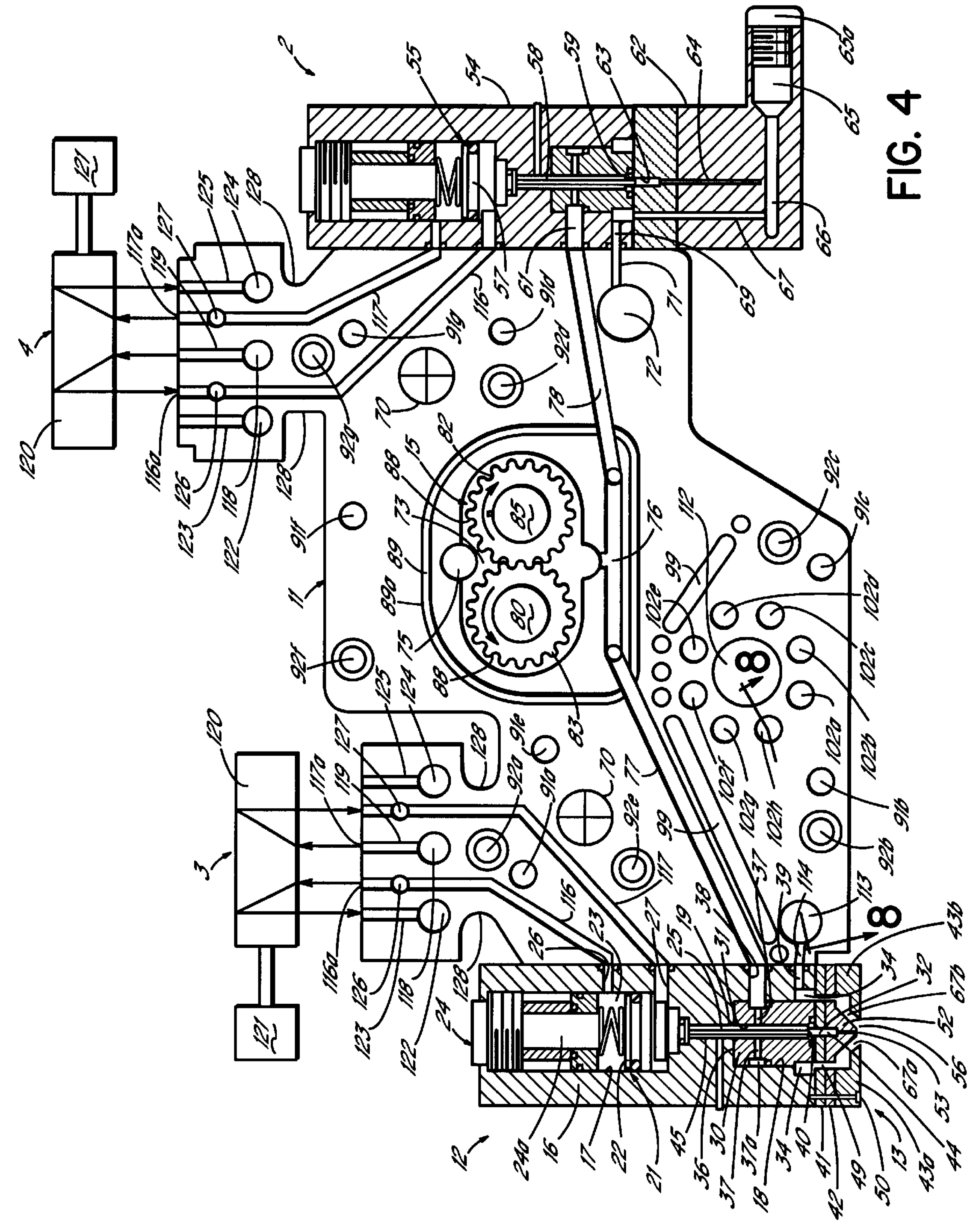
FIG. 4 is a side semi-sectional view illustrating die modules, recirculation modules, and gear pumps, with the cutting plane shown generally by line 4—4 of FIG. 2.

As best seen in FIG. 4, each die module 12 consists of a die body 16 and a die tip 13. The die body 16 has formed therein an upper circular recess 17 and a lower circular recess 18 which are interconnected by a body opening 19. The upper recess 17 defines a cylindrical chamber 23 which is closed at its top by threaded plug 24. A valve assembly 21 mounted within chamber 23 comprises piston 22 having depending therefrom stem 25. The piston 22 is reciprocally movable within chamber 23, with adjustment pin 24*a* limiting the upward movement Conventional o-rings may be used at the interface of the various surfaces for fluid seals as illustrated.

Side ports 26 and 27 are formed in the wall of the die body 16 to provide communication to chamber 23 above and below piston 22, respectively. As described in more detail below, the ports 26 and 27 serve to conduct air (referred to as instrument gas) to and from each side of piston 22.

Mounted in the lower recess 18 is a threaded valve insert member 30 having a central opening 31 extending axially therethrough and terminating in valve port 32 at its lower extremity. The lower portion of insert member 30 is of reduced diameter and in combination with the die body inner wall defined a downwardly facing cavity 34. Upper portion 36 of insert member 30 abuts the top surface of recess 18 and has a plurality (e.g. 4) of circumferential ports 37 formed therein and in fluid communication with the central passage 31. An annular recess 37*a* extends around the upper portion of 36 interconnecting the ports 37.

Valve stem 25 extends through body opening 19 and axial opening 31 of insert member 30, and terminates at end 40 which is adapted to seat on valve port 32. The annular space 45 between stem 25 and opening 31 is sufficient for polymer melt to flow therethrough. Stem end 40 of stem 25 seats on port 32 with piston 22 in its lower position within chamber 23. As discussed below, actuation of the valve stem 25 moves end 40 away from port 32 (open position as illustrated in FIG. 4), permitting the flow of polymer melt therethrough. Melt flows from the manifold segment 11*a* through side port 38, through 37, through the annular space 45 around stem 25 discharging through port 32 into the die tip assembly 13. Conventional o-rings may be used as the interface of the various surfaces as illustrated in the drawings.

The die tip assembly 13 illustrated in the drawings comprises a stack up of four parts: a transfer plate 41, a die tip 42, and two air plates 43*a* and 43*b*. The assembly 13 can be preassembled and adjusted prior to mounting onto the die body 16 using bolts 50.

Transfer plate 41 is a thin metal member having a central polymer opening 44 formed therein. Two rows of air holes 49 flank the opening 44 as illustrated in FIG. 4. When mounted on the lower mounting surface of body 16, the transfer plate 41 covers the cavity 34 and therewith defines an air chamber with the air holes 49 providing outlets for air from cavity 34 on each side of opening 44. Opening 44 registers with port 32 with an o-ring providing a fluid seal at the interface surrounding port 32.

The die tip 42 comprises a base member which is co-extensive with the transfer plate 41 and the mounting surface of die body 16, and a triangular nose piece 52 which may be integrally formed with the base.

As described in U.S. Pat. No. 5,618,566, the nose piece 52 terminates in apex which has a row of orifices spaced therealong and air plates 43*a*, 43*b* are in flanking relationship to the nose piece 52 and define converging air slits 67*a*, 67*b* which discharge at the apex of nose piece 52. Process air is directed onto opposite sides of the nose piece 52 into the converging air slits 67*a*, 67*b* and discharge therefrom as converging air sheets which meet at the apex of nose piece 52 in space 56 and contact filaments 14 emerging from the row of orifices 53. Process air is delivered from manifold segment 11*a* to the die body 16 through port 39.

Also useable in the present invention are modules 12 disclosed in U.S. Pat. No. 5,728,219 and U.S. patent application Ser. No. 09/021,426, filed on Feb. 10, 1998, now U.S. Pat. No. 6,210,141. Other types of modules 12 may also be used. The modules 12 may dispense meltblowing, spirals, beads, sprays or polymer coatings from the nozzle. Thus the module 12 may be provided with a variety of nozzles including meltblowing nozzles, spiral spray nozzles, bead nozzles, and coating nozzles.

Recirculation Module

As best seen in FIG. 4, recirculation module 2 comprises upper body 54 which is of the same design as body 16 of die module 12. Module 2 comprises valve assembly 55 which operates in the same manner as valve assembly 21 of module 12. Assembly 55 comprises pistion 57 and valve stem 58 which, when pneumatically activated by controller 5, will open 22, stem 25, and port 32 of die module 12.

With valve assembly 55 open, a molten polymer will enter module 2 from manifold passage 78 through port 61, flow around stem 58 and through port 59 into lower recirculation block 62. Block 62, for convenience of manufacture, may be constructed in one piece, or as illustrated in two pieces. The block 62 may be mounted on the body 54 by bolts (not shown), or by a quick change connector described in U.S. patent application Ser. No. 08/820,559, filed Mar. 19, 1997, now abandoned. Block 62 has orifice 63 which registers with port 59 and polymer flow passage 64. Orifice 63 intersects flow passage 66 which leads to right-angled passage 67 and module outlet 69. Outlet 69 registers with manifold segment inlet 71 which discharges the polymer to passage 72 which recirculates the polymer back to a supply tank (not shown). In the recirculation mode, valve 21 of the associated die module 12 will be closed and valve 55 opened. Passage 66 extends to outer outlet 65 which is sealed by plug 65*a*.

Manifold Construction

Segmented manifold 11 comprising segments 11*a–d* and end plates 7 and 8 are secured together using a plurality of countersunk bolts arranged in an alternating pattern. Referring to FIG. 2, each manifold segment 11*a*–11*d* has a plurality of bolt hole pairs with one hole being a threaded hole and the other hole being a bored and countersunk hole.

Segment 11*a*, for example, contains hole 91*a* which is threaded and hole 92*a* which is bored and countersunk as at 97*a*. Segment 11*b* likewise has threaded hole 91*b* and bored and countersunk hole 92*b*. For joining segments 11*a* and 11*b*, bolt 93*a* passes through bored hole 92*a* and is threaded into hole 91*b* and tightening of bolt 93*a* joins segments 11*a* and 11*b*. Segment 11*c* is likewise joined to segment 11*b* using bolt 93*b* which passes through bored and countersunk hole 92*b* into threaded hole 91*c*. The pattern is repeated over the length of the segments 11*a*–11*d* at several locations 91*d*–91*h* (threaded holes) and 92*c*–92*h* (bored and countersunk holes). The bolt hole pattern alternates between adjacent segments so that a bored and countersunk hole will always align with a threaded hole. In other words, in adjacent segments 11, the locations of holes 91*a*–91*h* and 92*a*–92*b* will alternate. End plate 7 is joined to segment 11*a* and end plate 8 is joined to segment 11*d* in a similar manner as illustrated in FIG. 2 at 97 and 98, respectively.

Upon tightening bolts 93*a*–93*h* (at all locations 92*a*–92*h*) a metal-on-metal fluid seal between segments 11*a* and 11*b* is established around registering polymer and air flow passages. Similarly, tightening bolt 93*b* creates a fluid seal between segments 11*b* and 11*c*. The depth of the 15 countersunk hole 92*a*–92*h* in each location is sufficient so that the head of the bolt 93*a*–93*h* therein lies below the opening of the hole 92*a*–92*h* and, therefore, when the bolts 93*a*–93*h* are tightened the lateral surfaces of the segments 11*a*–11*d* and end plates 7, 8 are flush with one another.

Figure 5:
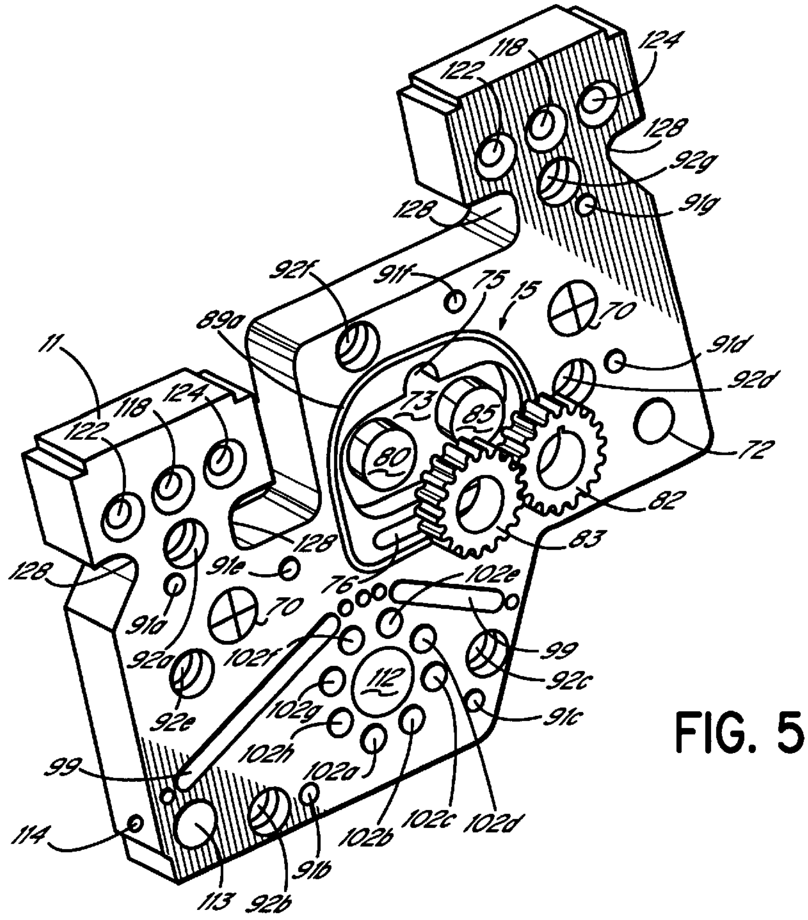
FIG. 5 is a perspective view of a manifold segment, shown partially exploded.

A large o-ring 89 in a suitable groove 89*a* (shown in FIG. 5) is provided around pump housing 73 as seen in FIG. 4 to seal the pump.

Referring to FIGS. 2, 3, 4 and 5 manifold 11 is of segmented design and comprises segments 11*a*–*d*. Although four segments 11*a*–11*d* are shown this is by way of illustration only and the number of segments may vary over a wide range depending on the application. Manifold 11 also comprises end plates 7 and 8. Plate 8 has a polymer inlet 81 which feeds all of the segments 11*a*–11*d* through continuous flow passage 75. Each segment 11*a*–11*d* also has a machined recess 73*a*–*d* which houses a rotary positive displacement pump (e.g. gear pumps 15*a*–*d*), respectively, and registers with polymer inlet passage 75. Each pump 15*a*–15*d* comprises a pair of intermeshing gears 82*a*–*d* and 83*a*–*d*. Keyed gears 82*a*–*d* (driven members) are driven simultaneously by a motor 84 connected to the gears by a continuous shaft 85 through a coupling 86, forming a drive system 87. As viewed in FIG. 4, gears 82*a*–82*d* are driven in a clockwise direction causing gears 83*a*–83*d* to rotate in the counterclockwise direction. Gears 83*a*–*d* are supported on continuous free-wheeling shaft 80.

Gears 82*a*–*d* and 83*a*–*d* have slip fits on shafts 85 and 80, respectively. Shaft 85 is sealed using an o-ring (not shown) disposed around the shaft 85 in end plate 8.

Although not shown, the drive system 87 may also include electric controls to vary the speed of the motor 84 and a gearbox speed reducer to reduce the speed of the pump drive shaft 85 from that of the motor shaft. For illustration purposes only, the motor speed may be in the range of 1500 to 2000 rpm whereas the speed of shaft 85 may be in the range of 0 to 105 rpm so that a 20:1 speed reducer may be required. Motor speed control and shaft speed reduction are within the realm of well-known art in the field and may vary within broad ranges to fit almost any application.

Polymer entering through inlet 75 is entrained between the teeth of each gear 82*a*–82*d*, 83*a*–83*d* as at 88 and carried thereby in the rotating direction into lower part of housing 73 and into central passage 76 which registers with the bottom (downstream side) of housing 73. The clearance between the gears 83*a*–83*d* and the walls of each housing 73*a*–73*d* is very small so that polymer between the gear teeth 88 cannot escape and, therefore, the pumps 15*a*–15*d* function as positive displacement pumps wherein the throughput of polymer through each pump 15*a*–15*d* is determined by the speed at which the gears 82*a*–82*d*, 83*a*–83*d* are driven. Gear pumps 15*a*–*d* are of substantially the same design as those disclosed in U.S. Pat. No. 5,236, 641 the disclosure of which is incorporated herein by reference.

As shown in FIG. 4, pump 15 delivers a pressurized molten polymer to the central passage 76, then to a discharge flow passage 77 to the fiberization die module 12 and to a manifold passage 78 leading to the recirculation module 2. In the assembled segments 11*a*–*d*, as best seen in FIGS. 2 and 4, pumps 15*a*–*d* deliver pressurized molten polymer to the fiberization die or the recirculation module. Passages 76*a*–*d* are individual passages within each segment and do not communicate with passages of adjacent segments. Passages 76*a*–*d* register with passages 77*a*–*d* which feed die modules 12*a*–*d* through ports 38*a*–*d* in the operating mode, respectively. On the opposite side passages 76*a*–*d* register with passages 78*a*–*d* which feed modules 2*a*–*d* through ports 61*a*–*d* in the recirculation mode. Because of the complexity of the structure, FIG. 4 illustrates one side of manifold segment 11*c* and sections of the modules 12 and 2 mounted thereon from a perspective of irregular line 4—4 of FIG. 2. It is recognized that several of the flow passages 77, 78, 71, 114, 116, 117, 123 should be properly represented by dashes—because they are hidden—but for clarity of description these passages are shown in solid lines.

Gear pumps 15*a*–*d* rotate at the same speed and deliver a pressurized polymer to polymer discharge passages 76*a*–*d*. The polymer therein will either flow to an individual die module 12 or to the associated recirculation module 2. By way of illustration, consider the case where it is desired to deliver polymer to die modules 11*a*–*c* only. In this instance valves 21*a*–*c* of the die modules 12*a*–12*c* would be opened by controllers 3*a*–*c* and valves 55*a*–*c* would be closed by controllers 4*a*–*c*, whereas die module valve 21*d* would be closed and valve 55*d* opened respectively by controllers 3*d* and 4*d*. Polymer would thus flow in parallel from passages 76*a*–*c* through passages 77*a*–*c* into modules 12*a*–*c* and be extruded to form polymer streams 14*a*–*c* on one side of the manifold 11. On the other side of the module 11, passage 76*d* will deliver polymer to passage 78*d* and recirculation module 2*d*. As has been described, the polymer will flow through module 2*d* and be recirculated via passage 72 within manifold 11 to the polymer supply reservoir. Any other operation/recirculation combination of segments 11*a*–*d* is also possible by selectively programming controller 3*a*–*d* and 4*a*–*d*.

Outlet 72*a*–72*d* of each segment 11*a*–11*d* is aligned with the corresponding outlets 72*a*–72*d* of the other manifold segments 11*a*–11*d* and thus serves as a common outlet for all of the recirculation modules. Each individual module outlet 69*a*–*d* registers with an individual manifold inlet 71*a*–*d* (shown as 71 in FIG. 4), which all register with a continuous outlet flow passage 72 extending the length of the manifold 11 which has an outlet 72*a* at one side of the die which leads to a supply tank.

As has been mentioned, pumps 15*a*–*d* are rotary positive displacement pumps whose throughput is determined by the speed of the pump. In this way the pumps act as flow meters for delivering the polymer at a very precise flow rate. Furthermore, because all the pumps operate at the same speed the flow rate of polymer to each die module will be the same (typically less than 5% variation from module-to-module). The result is an extremely uniform polymer stream 14 and end-product 20 (see FIG. 1) over the die length.

An important aspect of the present design is that the polymer flow system downstream of pumps 15*a*–*d* while in the operational mode (i.e. flow through die modules 12*a*–12*d*) is constantly under pressure induced by the pumps. When switching a segment from operational mode to recirculation mode it is important to maintain the same operating pressure so that there will be a smooth transition in polymer flow when the segment is switched back to the operational mode. If the pressure is significantly higher or lower than the operating pressure while in the recirculation mode, a transient such as a surge in polymer flow through the die module may occur when the segment is switched again from the recirculation to the operational mode.

Maintaining operating pressure while in the recirculation mode is accomplished by sizing orifice 63 in the recirculation block 62 in relation to the viscosity of the polymer being processed so that the orifice 63 will provide the correct amount of flow resistance to maintain operating pressure upstream of the orifice 63. Different size orifices 63 are required for different polymers.

In another preferred embodiment, outlet 72*a* may be sealed with a threaded plug (not shown), and plug 65*a* at outlet 65 may be removed. A spring-loaded needle valve (not shown) may be disposed in outlet 65 wherein the tension in a spring determines the pressure required to displace a needle of the valve and thereby regulate the operating pressure. A recirculation hose (not shown) may be connected to the outlet 65 and to the polymer supply tank. An adjustable needle valve may be provided to allow variation of operating and recirculation pressure through valve spring tension for polymers having different flow properties.

Another important aspect of the present invention is the location of the rotary positive displacement pumps 15*a*–15*d* internal to each manifold segment 11*a*–11*d*. This streamlines the structure and facilitates connecting a single drive shaft 85 to all the pumps 15*a*–15*d* in the manifold 11. The axis of rotation of the driven gears 82*a*–82*d* is parallel to the row of fiber forming means of the assembled manifold 11.

Electric heaters 70 may be provided in the aligned segments 11*a*–11*d* to maintain the polymer melt flowing through the manifold segments 11*a*–11*d* at the proper temperature.

Modular Pump

In an alternate preferred embodiment of the present metering die, each pump 15*a*–15*d* which is assembled within manifold 11 is replaced with a self-contained modular pump 130, depicted in FIGS. 9–13. Manifold segment 11 is modified to contain a cavity wherein the modular pump is placed for operation. The modular pumps are of rotary gear design and similar to non-modular pumps 15*a*–*d*in terms of the principles of operation (i.e. polymer flow and metering).

Returning to the first embodiment as seen in FIG. 2, driven gears 82*a*–*d* are mounted on integral drive shaft 85 which extends through each manifold segment 11*a*–11*d*, and gears 83*a*–*d* are supported on integral shaft 80. The lengths of shafts 85 and 80 must be sized in relation to the number of manifold segments 11*a*–11*d* to be used. Adding or removing manifold segments 11*a*–11*d* would require replacing the two shafts 85, 80 with shafts 85, 80 of different lengths. Therefore, to add even a single segment onto the end of the die, all the gears 82*a*–82*d*, 83*a*–83*d* on the two shafts 85, 80 would have to be removed and remounted on new shafts 85, 80 in the configuration described previously in relation to FIGS. 2, 4, and 5. The only way this can be accomplished is to disconnect each manifold segment 11*a*–11*d*, which amounts to disassembling the entire manifold 11. Note also that if a pump 15*a*–15*d* becomes clogged or damaged requiring cleaning or replacement, a similar situation arises. Disassembling the manifold is time-consuming and inefficient. In addition, housing 73 (including o-ring groove 89*a*) in manifold 11 is expensive to manufacture.

The modular pump described below is designed to overcome these difficulties. A principal advantage of the modular pump 130*a*–130*d* is that each pump 130*a*–130*d* comprises its own drive shaft 143 that connects to the drive shafts 143 of adjacent pumps 130*a*–130*d* using a tang-in-slot coupling. Each pump 130*a*–130*d* also has its own idler shaft 149 as will be described. Thus, integral shafts 85 and 80 are replaced with segmented shafts. The modular design allows manifold segments to be added or removed without the need to disassemble the entire manifold. Housing 73 in the manifold segment 11 is replaced with a simplified mounting cavity for the modular pump that is less expensive to manufacture.

Figure 9:
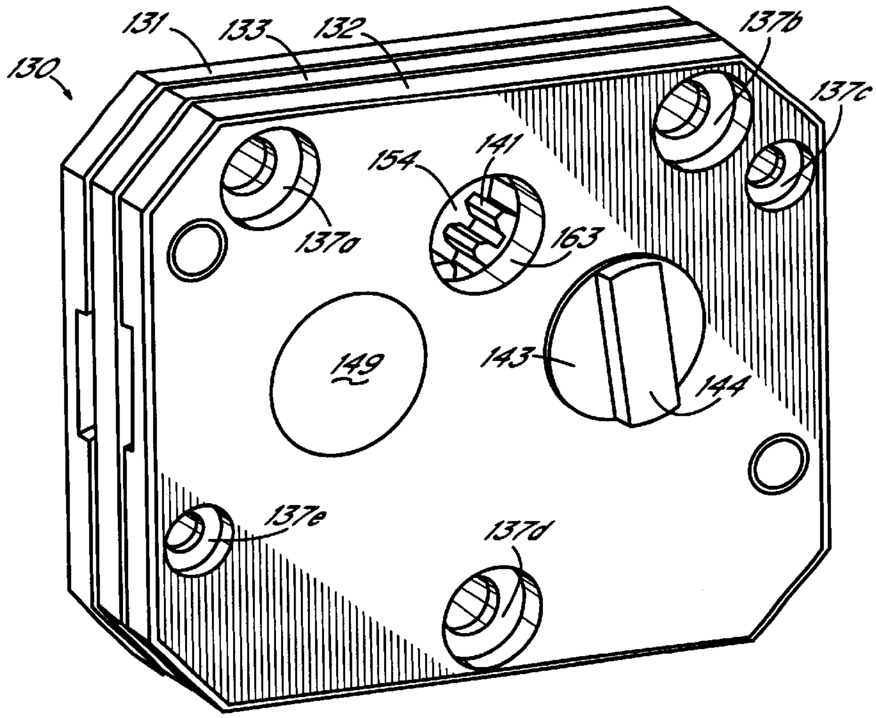
FIG. 9 is an elevational view of the modular pump.
Figure 10:
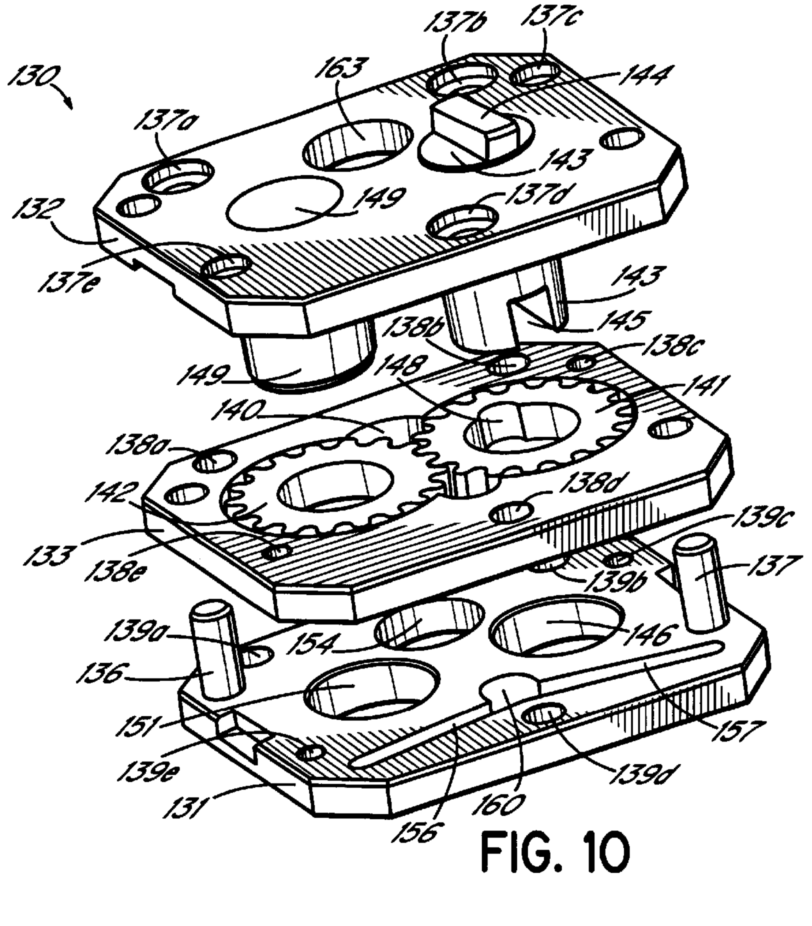
FIG. 10 is an exploded view showing the internal structure of the modular pump.

With reference to FIGS. 9 and 10, modular pump 130 comprises endplates 131 and 132 and center plate 133 sandwiched therebetween. Note in FIG. 13 four pump units are shown labeled 130*a*–10*d*. Endplate 131 has pins 136 and 137 which mate with holes in plates 132 and 133 for precisely aligning the plates. Plate 132 has countersunk and bored holes 137*a*–*e* whereas middle plate 133 has clearance holes 138*a*–*e* and endplate 131 has threaded holes 139*a*–*e*. Bolts (not shown) are inserted into holes 137*a*–*e*, pass thorugh holes 138*a*–*e* and are threaded into holes 139*a*–*e* for joining the three plates together and for providing a fluid seal at the interfaces of the plates. Holes 137*a*–*e* are sized so that the heads of the bolts do not extend beyond the outer surface of plate 132.

Figure 11:
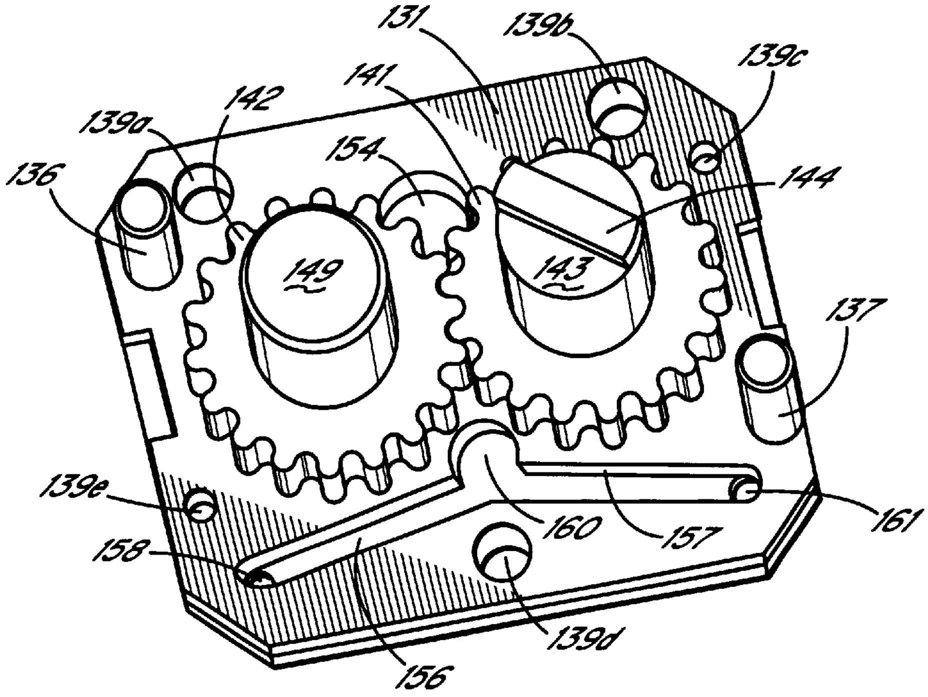
FIG. 11 is an elevational view of an endplate and metering gears of the modular pump.

As seen in FIGS. 10 and 11, pump 130 also comprises intermeshing gears 141 and 142 rotatably disposed in housing 140 formed in center plate 133. Gear 141 is a driven gear and 142 is an idler gear. The thickness of plate 133 is slightly larger than that of gears 141 and 142 so that the gears 141, 142 are free to rotate after plates 131, 132 and 133 have been bolted together. Pump 130 further comprises drive shaft 143 having tang 144 at one end and slot 145 on the opposite end. Shaft 143 passes through holes 146 and 147 in the endplates 131 and 132, respectively. The holes are slightly larger than the diameter of the shaft so that the shaft is free to rotate. The holes are sized, however, so that they provide a bearing-type support for the drive shaft as it rotates. Driven gear 141 is secured to shaft 143 using a key inserted in slot 148 and a corresponding slot in the shaft (not shown).

As best seen in FIG. 10, idler shaft 149 is press fit into hole 151 of plate 131 at one end, passes rotatably through the center hole of idler gear 142, and is press fit into hole 152 of plate 132. The press fit into holes 151 and 152 is accomplished as the plates are bolted together. The press fit on each end of shaft 149 establishes a fluid seal between the shaft and the endplates.

Manifold segment 150 (FIG. 12) has formed therein pump cavity 153. The outer dimensions of the cavity are slightly larger by about 0.01 inch than the outer periphery of the modular pump so that the pump fits into the cavity without requiring a press fit. The width of pump 130 is approximately 0.001 inches smaller than the depth of cavity 153. Pump 130 is manufactured from a type of steel that has a higher thermal expansion rate than the steel used for manifold 150. The pump width is smaller than the cavity depth to allow for the pump to expand as the die is heated. The preferred overall thickness of pump 130 is between 0.5 and 0.7 inches.

Manifold 150 has polymer outlet 155 which registers with polymer inlet 154 of pump 130 (see FIGS. 9 and 10) with the pump 130 inserted into the cavity 153. The outlet of the pump 130 is formed in endplate 131 as best seen in FIGS. 10 and 11. The outlet comprises recess 160 which opens into flow channels 156 and 157. Channel 156 has outlet hole 158 which registers with inlet 159 of manifold 150 for feeding die module 12. Channel 157 has outlet 161 which registers with manifold inlet 162 for feeding recirculation module 2. Thus polymer enters the pump at inlet 154, is entrained by the teeth of gears 141 and 142, flows around the outer periphery of the gears (gear 141 is driven clockwise as viewed in FIG. 11) into recess 160, into channels 156 and 157, into outlets 158 and 161, and enters the manifold at 159 and 162. After the polymer leaves pump 130 to either the die module or the recirculation module, the polymer flow is the same as has been described with reference to non-modular pump 15. The process air flow and instrument gas flow (described below) are identical to the embodiment of FIGS. 3 and 4.

Pump 130 also comprises outlet hole 163 which allows polymer to flow into an adjacent manifold and pump segment. Thus a portion of the polymer entering the pump flows through the pump and the rest flows through hole 163 into a neighboring segment. With a plurality of manifold segments 11 and pumps 130 assembled in stacked relation, holes 154, 155, and 163 of all the segments form a continuous flow passage along the length of the die. o-rings (not shown) are provided around polymer holes 155, 159, 162, and shaft hole 164 in manifold 150 to establish fluid seals between the manifold and pump 130. O-rings are also provided around the outside of hole 163 and shaft hole 147 of pump plate 132 to establish a seal at the abutting surface of the adjacent manifold segment.

Figure 12:
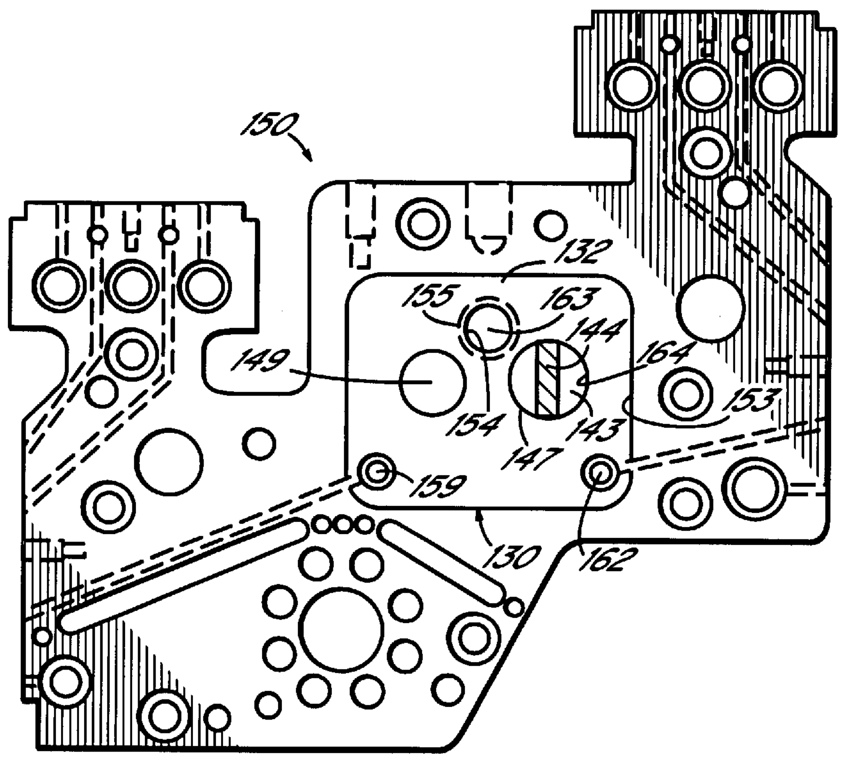
FIG. 12 is a side view of a manifold segment for use with the modular pump.
Figure 13:
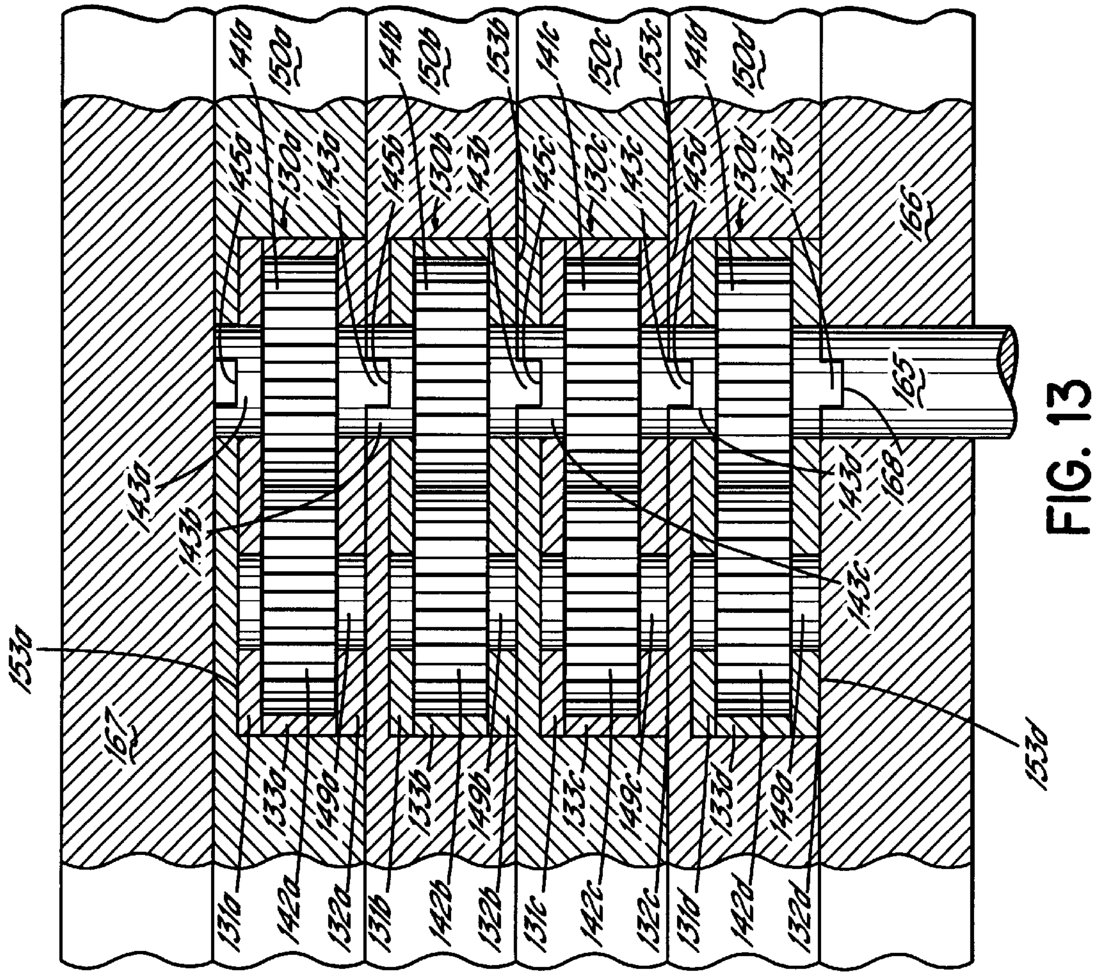
FIG. 13 is a top sectional view showing the coupling of the drive shafts of the modular pumps.

The present modular pump 130*a*–130*d* wherein each pump 130*a*–130*d* has its own drive shaft 143 and idler shaft 149 allows segments 11 to be added or removed without the necessity of disassembling the manifold. As seen in FIGS. 12 and 13, manifold 150 has hole 164 which allows pump drive shaft 143 to pass therethrough. Shaft 143 has tang 144 at one end and slot 145 at the other end. As best seen in FIG. 13, adjacent pumps are oriented so that the slot of one shaft will align and mate with the tang of the adjacent shaft as shown at 144*a* and 145*b*, 144*b* and 145*c*, and so on along the length of the die. Drive shaft 165 has slot 168 which is coupled to tang 144*d* of pump shaft 143*d*. Drive shaft 165 passes through endplate 166 and is coupled to a motor (not shown) for driving all of the coupled shafts 143*a*–*d* together. Cavity 153 of manifold 150 is slightly oversized (viz. 0.01 inch) in relation to the outer dimensions of pump 130 so that in the coupled configuration each pump 130 may move slightly whereby no binding between the coupled shafts 143*a*–143*d* occurs. Also a small amount of tolerance between the tang 144 and slot 145 is provided to eliminate binding.

The present design allows segments to be added or removed without the need for replacing the drive shaft 85 and idler shaft 80 as in the integral shaft design of FIG. 2. For example if segment 150*a* in FIG. 13 is to be removed, die endplate 167 will be unbolted from segment 150*a*, the segment along with pump 130*a* will be unbolted and disconnected from segment 150*b* with drive shafts thereof being uncoupled at 144*a* and 145*b*, and endplate 167 bolted onto segment 150*b* to complete the procedure. Manifold segments 150*a*–*d* are bolted together in the same fashion as has been described in relation to FIG. 2. The polymer flow through from the manifold to the inlets of modules 12 and 2 is the same as has been described in relation to FIGS. 2 and 4.

Process Air Flow

Figure 6:
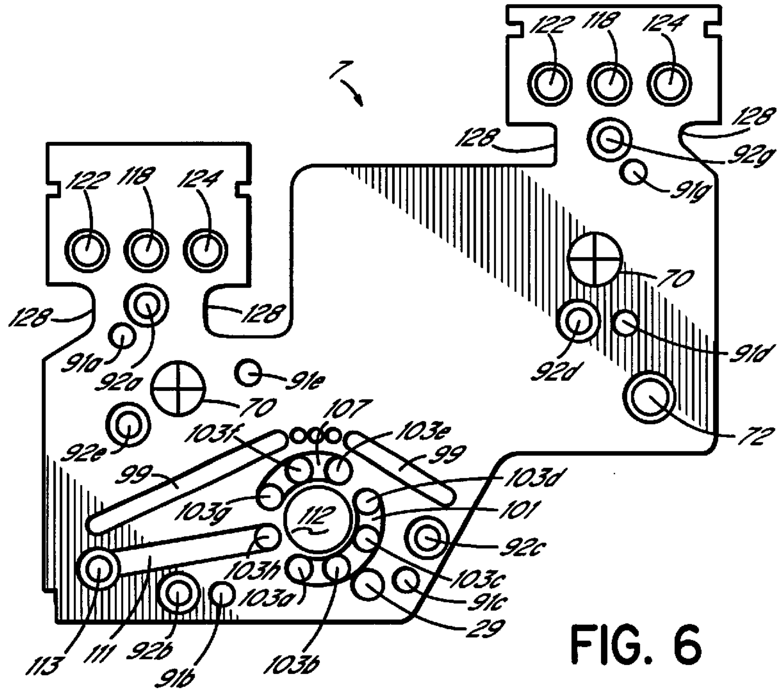
FIGS. 6 and 7 are side views of the interior surfaces of the die endplates with the cutting planes taken generally along lines 6—6 and 7—7 of FIGS. 2 and 3, respectively.
Figure 7:
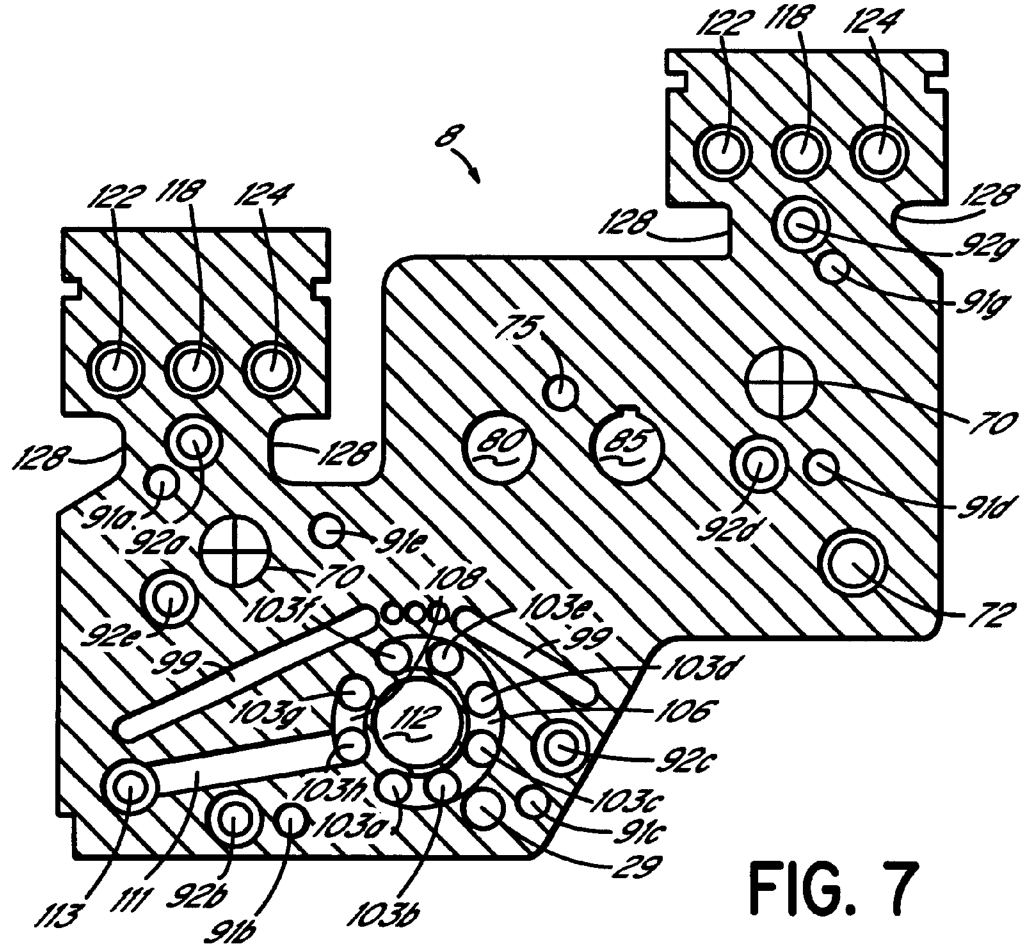

Referring to FIGS. 2 through 7, heated process air enters through inlet 29 which registers with circular groove 101 (FIG. 6) formed along the inner wall of the endplate 7. Middle segments 11*a*–*d* have a plurality of holes 102*a*–*h* which when assembled form continuous flow passages 103*a*–h which travel the length of the die 11 as seen in FIG. 3 (103*c,d* not shown). Process air inlet 29 registers with groove 101 as seen in FIG. 6. The inlets of passages 103*a*–*d* register with groove 101 so that air entering the groove via inlet 29 will enter the passages and flow the length of the die from plate 7 to plate 8 in parallel. The outlet of passages 103*a*–*d* register with groove 106 formed in end plate 8 (FIG. 7). Groove 106 also registers with inlets to flow passages 103*e,f* which turns the air and causes the air to flow back along the length of the die in the direction opposite that of passages 103*a*–*d*. The outlets to passages 103*e,f* register with groove 107 formed in plate 7 which receives the air and turns the air again to travel back along the length of the die through passage 103*g* which discharges into groove 108 of end plate 8. A portion of the air travels back along the die length through passage 103*h* while the rest of the air flows from groove 108 towards the manifold discharge through slot 109 in plate 8. Air which returns to plate 7 through passage 103*h* flows towards the manifold discharge through slot 111. Thus the air makes three or four passes along the length of the die before being discharged to the die modules. The direction of air flow in passages 103*a*–*h* is illustrated by arrows 90 in FIG. 3. Central heating element 112 heats the multi-pass air to the operating temperature. Because the process air temperature is hotter than the polymer operating temperature isolation slots 99 are provided in plates 7 and 8, and 11*a*–*d* to disrupt heat flow between the process air flow and polymer flow passages of the manifold.

Figure 8:
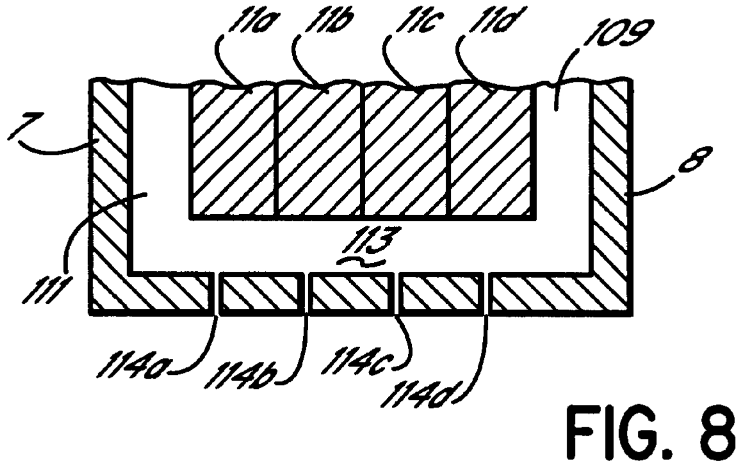
FIG. 8 is a sectional view taken generally along line 8—8 of FIG. 4 illustrating the process air flow to the die modules.

As seen in FIGS. 3 and 8, process air flows towards the manifold discharge along both sides of the manifold through slots 109 and 111. Plates 11*a*–*f* have holes which define air passage 113 which extends the length of the die. Slots 109 and 111 discharge from opposite sides into passage 113 which feeds in parallel holes 114*a*–*d* which in turn feed air inputs 39*a*–*d* in die modules 12*a*–*d*, respectively. The air flows through the die modules as has been described and is discharged as converging sheets of air onto fibers 14 extruded at die tip apex 56.

Instrument Air

Referring to FIGS. 2 and 3 each die module 12 and recirculation module 2 have valve assemblies which are activated (opened or closed) by a pneumatic controller (actuator) 3 and 4, respectively. The operation of each controller is identical and, therefore, only actuator 3 for the die module will be described it being understood that the functioning of recirculation actuator 4 will be the same. The same reference numerals for the instrument air passages and controls for actuating the valve assembly 55 of recirculation module 2 are used for corresponding passages and controls for activating die module 12. It is also to be understood, however, that associated actuators (e.g. 3*a* and 4*a*) will generally operate in opposite modes. When controller 3*a* commands die module valve 21*a* to open, controller 4*a* will simultaneously command recirculation module valve 55 to be closed and visa-versa. However, as has been described some die segments may be in the operational mode (polymer flow to die modules) while others are in the recirculation mode (polymer flow to recirculation module) to produce stream 14 having different patterns.

Each die module comprises a valve assembly 21 which is actuated by compressed air acting above or below piston 22.

Instrument air is supplied to the top and bottom air chambers on each side of valve piston 22 (see FIG. 4) by flow lines 116 and 117 formed in each middle plate 11*a–d*. Controller 3 comprises three way solenoid valve 120 with electronic controls 121 to control the flow of instrument air. Instrument air enters the die through inlet 115 into continuous flow passage 118 which serves all the die segments (the configuration of inlet 115 and passage 118 in relation to the modules is illustrated in FIG. 3 for the recirculation modules, the configuration being the same for the die modules). Passage 119 in each segment delivers the air in parallel (see FIG. 3) to each of solenoid valves 120*a–d* (shown schematically in FIG. 4). The valve delivers the air to either passage 116 or 117 depending on whether the module valve 21 is to be opened or closed. As illustrated in FIG. 4, pressurized instrument air is delivered via line 117 to the bottom of the piston 22 which acts to force the piston upward, while the controller simultaneously opens the air chamber above the piston (to relieve the air pressure above) to exhaust port 122 via lines 116 and 123. In the upward position, valve stem 25 unseats from port 32 thereby opening the polymer flow passage to the die tip. In the closed position, solenoid 120 would deliver pressurized air to the upper side of piston 22 through line 116 and would simultaneously open the lower side of the piston to exhaust port 124 via line 125. The pressure above the piston forces the piston downward and seats valve stem 25 onto port 32 thereby closing the valve. Thus in a preferred mode each die module has a separate solenoid valve such that the polymer flow can be controlled through each die module independently. In this mode side holes 126 and 127 which intersect passages 116 and 117, respectively, are plugged.

In a second preferred embodiment a single solenoid valve may be used to activate valves 21 in a plurality of adjacent die modules. In this configuration the tops of holes 116 and 117 (labeled 116*a* and 117*a*) are plugged and side holes 126 and 127 opened. Side holes 126 and 127 are continuous holes and will intersect each of the flow lines 116 and 117 to be controlled. Thus in the closed position, pressurized air would be delivered to all of the die modules simultaneously through hole 126 while hole 127 would be opened to the exhaust. The instrument air flow is reversed to open the valve.

As has been stated the principle of operation of the controllers 4 is the same as has been described for controls 3. The mode of operation (i.e. operational mode/recirculation mode), however, of controller 4 will generally be opposite that of controller 3.

Manifold segments 11*a–d* and endplates have inwardly tapered surfaces 128 beneath controllers 3*a–d* and 4*a–d* to provide a large heat transfer surface area. This is done to dissipate sufficient heat to maintain the area above the tapers at a low temperature to protect the electronic controls of controllers 3 and 4.

Assembly and Operation

As indicated above, the modular die assembly 10 of the present invention can be tailored to meet the needs of a particular operation. As illustrated in FIGS. 1, 2 and 3, four die segments 11*a–d*, each about 0.75 inches in width are used in the assembly 10. The manifold segments 11 are bolted together as described previously, and the heater elements installed. The length of the heater elements will be selected based on the number of segments 11 employed and will extend through most segments. The die modules 12 and recirculation modules 2 may be mounted on each manifold segment 11 before or after interconnecting the segments 11, and may include any of the nozzles 13 previously described. These may include meltblowing nozzles (die tips), spiral spray nozzles, bead or coating nozzles, or combinations of these.

A particularly advantageous feature of the present invention is that it permits (a) the construction of a meltblowing die with a wide range of possible lengths, interchangeable manifold segments, and self contained modules, (b) variation of die nozzles (e.g. meltblowing, spiral, or bead applicators) to achieve a predetermined and varied pattern, (c) metering of polymer flow rate to each nozzle to provide uniformity along the die length, and (d) the production of polymer coatings having a pre-determined pattern. The segments 11 are assembled by installing each segment on the shaft, bolting the segment in place, and continuing the addition of segments until the desired number has been installed on the shaft.

Variable die length and adhesive patterns may be important for applying adhesives to substrates of different sizes from one application to another. The following sizes and numbers are illustrative of the versatility of the modular die construction of the present invention.

| Die Assembly | Broad Range | Preferred Range | Best Mode |
|---|---|---|---|
| Number of Segments | 1–1,000 | 2–100 | 5–50 |
| Length of each Segment in machine direction (inches) | 0.25–1.50" | 0.5–1.00" | 0.5-0.8" |
| Different Types of Nozzles (13) (e.g. meltblowing, spiral, spray, and bead) | 2–4 | 2–3 | 2 |

The lines, instruments, and controls are connected and operation commenced. A hot melt adhesive is delivered to the die 10 through line 81, process air is delivered to the die through line 29, and instrument air or gas is delivered through line 115.

Although the preferred embodiment of the present invention is in connection with a plurality of manifold/module segments, there are aspects of the invention applicable to single manifold/module constructions or unitary dies. For example the internal metering pump can be used with advantage on most any type of fiberization die. Also, the recirculation module can be used with a fiberization die fed by an external metering pump.

Actuation of the control valves 21 opens port 32 of each module 12 as described previously, causing polymer melt to flow through each module 12. In the meltblowing segments 11, the melt flows through manifold passage 75, through pump 15, into passages 76 and 77, through side ports 38, through passages 37 and annular space 45, and through port 32 into the die tip assembly 13. The pumps 15 used in the present invention are similar in design to those of U.S. Pat. No. 5,236,641. The polymer melt is distributed laterally in the die tip 13 and discharges through orifices 53 as side-by-side filaments 14. Air meanwhile flows from manifold passages 29, 103, 111, 109, 113, and 114 where the air is heated. Air enters each module 12 through port 39 and flows through holes 49 and into slits discharging as converging air sheets at or near the die tip apex of the nose piece 52. The converging air sheets contact the filaments 14 discharging from the orifices 53 and by drag forces stretch them and deposit them onto the underlying substrate in a random pattern. This forms a generally uniform deposit of meltblown material on the substrate.

Once production has begun, and the die assembly is in the operational mode, the pattern of meltblown material may be varied by switching any combination of the die segments from the operational mode to the recirculation mode. Controller 3 of a segment to be switched would command valve 21 of the fiberization die module 12 to close while controller 4 would command valve 55 of the recirculation module to open whereby the flow of polymer through the discharge line from the pump switches from the die module to the recirculation module. Because the die segments are narrow in the machine direction, and because a large number of segments may be employed, a wide variety of precisely placed coatings may be produced. Die segments may be switched back and forth between the operational mode and recirculation mode at the will of the operator.

In each of the modules 12, the polymer and air flows are basically the same, with the difference being, however, in the nozzle type provided on the module. In the spiral nozzle, a monofilament is extruded and air jets are directed to impart a swirl on the monofilament. The swirling action draws down the monofilament and deposits it as overlapping swirls on the substrate as described in the above referenced U.S. Pat. No. 5,728,219. In the non-air assisted nozzles, the air ports are sealed off, and only a continuous bead or layer is dispensed from the die module. As noted above the assembly 10 may be provided with different nozzles to achieve a variety of deposition patterns.

Typical operational parameters are as follows:

| | |
|---|---|
| Polymer | Hotmelt adhesive |
| Temperature of the Die and Polymer | 280° F. to 325° F. |
| Temperature of Air | 280° F. to 325° F. I |
| Polymer Flow Rate | 0.1 to 10 grms/hole/min. |
| Hot air Flow Rate | 0.1 to 2 SCFM/inch |
| Deposition | 0.05 to 500 g/m$^2$ |

As indicated above, the die assembly 10 may be used in meltblowing any polymeric material, but meltblowing adhesives is the preferred polymer. The adhesives include EVA's (e.g. 20–40 wt % VA). These polymers generally have lower viscosities than those used in meltblown webs. Conventional hot melt adhesives useable include those disclosed in U.S. Pat. Nos. 4,497,941, 4,325,853, and 4,315,842, the disclosure of which are incorporated herein by reference. The preferred hot melt adhesives include SIS and SBS block copolymer based adhesives. These adhesives contain block copolymer, tackifier, and oil in various ratios. The above melt adhesives are by way of illustration only; other melt adhesives may also be used.

Although the present invention has been described with reference to meltblowing hot melt adhesive, it is to be understood that the invention may also be used to meltblow polymer in the manufacture of webs. The dimensions of the die tip may have a small difference in certain features as described in the above referenced U.S. Pat. Nos. 5,145,689 and 5,618,566.

The typical meltblowing web forming resins include a wide range of polyolefins such as propylene and ethylene homopolymers and copolymers. Specific thermoplastics include ethylene acrylic copolymers, nylon, polyamides, polyesters, polystyrene, poly(methyl methacrylate), polytrifluoro-chloroethylene, polyurethanes, polycarboneates, silicone sulfide, and poly(ethylene terephthalate), pitch, and blends of the above. The preferred resin is polypropylene. The above list is not intended to be limiting, as new and improved meltblowing thermoplastic resins continue to be developed.

The invention may also be used with advantage in coating substrates or objects with thermoplastics.

The thermoplastic polymer, hot melt adhesives or those used in meltblowing webs, may be delivered to the die by a variety of well known means including extruders metering pumps and the like. It will be understood by those skilled in the art that the present invention may be used with air assisted or non-air assisted die assemblies.

What is claimed is:

1. A segmented die assembly comprising:

(a) a plurality of manifold segments, each having an inlet polymer flow passage and a polymer discharge flow passage formed therein; said manifold segments being interconnected in side-by-side relationship wherein said inlet polymer flow passages are in fluid communication, respectively, and each manifold segment including a rotary positive displacement pump for receiving a polymer melt from said inlet polymer flow passage and discharging the polymer melt into said polymer discharge flow passage, said positive displacement pump including a driven rotary member;

(b) a shaft extending through said manifold segments and connected to said driven rotary member of each manifold segment, said shaft comprising a stub shaft mounted in each manifold segment, and said stub shafts being interconnected in end-to-end relationship;

(c) a motor for driving said shaft so that said motor drives said interconnected stub shafts as a unit whereby said rotary positive displacement pump of each manifold segment pumps polymer melt into its respective polymer discharge flow passage;

(d) a die module comprising (i) a die body mounted on each manifold segment and having a polymer flow passage in fluid communication with the polymer discharge flow passage of its associated manifold segment; and (ii) a nozzle mounted on the die body and having a polymer flow passage in fluid communication with said polymer flow passage of its associated die body for receiving the polymer melt and discharging a filament or filaments of the polymer melt therefrom; and (e) means for delivering a polymer melt to said inlet polymer flow passage of each manifold segment whereby the melt is distributed to said inlet polymer flow passages of the manifold segments and flows in each segment to said pump, said discharge flow passage and said flow passages of said die body and said nozzle.

2. The die assembly of claim 1, wherein at least two of said manifold segments are identical.

3. The die assembly of claim 1, wherein the positive displacement pump of each manifold segment comprises a gear pump.

4. The die assembly of claim 3, wherein each manifold segment includes a recess and wherein said gear pump of each manifold segment comprises a pair of intermeshed gears located internal to said recess of said manifold segment, said recess sealed by an adjacent manifold segment.

5. A segmented die assembly, comprising:

(a) a plurality of manifold segments interconnected in side-by-side relationship, each manifold segment having (i) an inlet polymer flow passage formed therein;

(ii) a rotary positive displacement pump mounted therein for receiving a polymer melt from its respective inlet polymer flow passage and discharging the polymer melt into a polymer discharge flow passage, said positive displacement pump including a driven rotary member; and (iii) a stub shaft drivingly connected to said driven rotary member;

(b) a means for interconnecting said stub shafts in end-to-end relationship whereby rotation of said interconnected stub shafts rotates said rotary member in unison;

(c) a motor for rotating said interconnected stub shafts whereby said rotary positive displacement pump of each manifold segment pumps polymer melt into its respective polymer discharge flow passage;

(d) a die module comprising (i) a die body mounted on each manifold segment and having a polymer flow passage in fluid communication with said polymer discharge flow passage of its associated manifold segment; and (ii) a nozzle mounted on said die body and having a polymer flow passage in fluid communication with said polymer flow passage of its associated die body for receiving the polymer melt and discharging a filament or filaments of the polymer melt therefrom; and (e) means for delivering the polymer melt to said inlet polymer flow passage of each manifold segment whereby the melt is distributed to said inlet polymer flow passages of said manifold segments and flows in each segment to the pump, said discharge flow passage and said flow passage of said die body and said nozzle.

6. A die assembly manifold for operating a selectable number of die modules and a corresponding number of recirculation modules, said die assembly manifold comprising:

(a) a plurality of manifold segments corresponding to the selectable number of die modules, said manifold segments being interconnected in side-by-side relationship, each manifold segment including:

(i) a polymer inlet flow passage in fluid communication with an adjacent manifold segment forming a continuous polymer flow passage;

(ii) a polymer discharge flow passage configured to provide a pressurized polymer melt to the die modules and the recirculation modules associated with the manifold segment;

(iii) a rotary positive displacement pump for receiving a polymer melt from said polymer inlet flow passage and discharging the pressurized polymer melt into said polymer discharge flow passage;

(iv) a first die module instrument air passage for one of the selectable number of die modules; and (v) a first recirculation module instrument air passage for one of the corresponding number of recirculation modules;

(b) a pair of end plates laterally closing the plurality of manifold segments, said pair of end plates configured to provide the polymer melt to said continuous polymer flow passage; and (c) a pump drive shaft extending through said manifold segments and connected to each rotary positive displacement pump to drive each pump and maintain operating pressure of the polymer melt within said manifold segments.

7. The die assembly manifold of claim 6, wherein the die modules are pneumatically controllable by a die module pneumatic controller, and each manifold segment further comprises:

a first input instrument air flow passage in gaseous communication with the other manifold segments to form a continuous instrument air input flow passage, said continuous instrument air input flow passage configured to provide instrument air to the die module pneumatic controller;

a first exhaust instrument air flow passage in gaseous communication with the other manifold segments to form an exhaust instrument air continuous flow passage, said exhaust instrument air continuous flow passage configured to exhaust instrument air from the die module pneumatic controller; and a second die module instrument air passage, said first and second die module instrument air passages each configured to be in gaseous communication between the die module pneumatic controller and a selected one of the die modules for selectively opening and closing the selected one of the die modules.

8. The die assembly manifold of claim 7, wherein the recirculation modules are pneumatically controllable by a recirculation module pneumatic controller, each manifold segment further comprising:

a second input instrument air flow passage in gaseous communication with the other manifold segments to form a second continuous instrument air input flow passage, said second instrument air input flow passage configured to provide instrument air to the recirculation module pneumatic controller;

a second exhaust instrument air flow passage in gaseous communication with the other manifold segments to form a second exhaust instrument air continuous flow passage, said second exhaust instrument air continuous flow passage configured to exhaust instrument air from the recirculation module pneumatic controller; and a second recirculation module instrument air passage, said first and second recirculation module instrument air passages each configured to be in gaseous communication between the recirculation module pneumatic controller and a selected one of the recirculation modules for selectively opening and closing the recirculation module.

9. The die assembly manifold of claim 6, wherein each die module includes a meltblowing nozzle configured to discharge process air to displace a filament dispensed by the die module, the pair of end plates further configured to provide process air to said plurality of manifold segments, each manifold segment further comprising:

a process air passage in gaseous communication with the other manifold segments to form a continuous process air flow passage, the process air flow passage configured to provide process air to a respective one of the die modules.

10. The die assembly manifold of claim 9, wherein said process air flow passage of each manifold segment comprises a plurality of holes, said pair of end plates including slots coupling said plurality of holes to form a continuous process air flow passage adapted to be heated during multiple passes of the process air through the plurality of manifold segments.

11. A die assembly for operating a selectable number of die modules and a corresponding number of recirculation modules, comprising:

(a) a plurality of manifold segments corresponding to the selectable number of die modules, said manifold segments being interconnected in side-by-side relationship, each manifold segment including:

(i) a polymer inlet flow passage in fluid communication with an adjacent manifold segment forming a continuous polymer flow passage;

(ii) a polymer discharge flow passage configured to provide a pressurized polymer melt to the die modules and the recirculation modules associated with the manifold segment;

(iii) a rotary positive displacement pump for receiving a polymer melt from said polymer inlet flow passage and discharging the pressurized polymer melt into said polymer discharge flow passage;

(iv) a first die module instrument air passage for one of the selectable number of die modules; and (v) a first recirculation module instrument air passage for one of the corresponding number of recirculation modules;

(b) a pair of end plates laterally closing the plurality of manifold segments, said pair of end plates configured to provide the polymer melt to said continuous polymer flow passage;

(c) a pump drive shaft extending through said manifold segments and connected to each rotary positive displacement pump to drive each pump and maintain operating pressure of the polymer melt within said manifold segments;

a motor operably coupled to said drive shaft to drive said plurality of rotary positive displacement pumps; and a plurality of die modules each comprising (i) a die body mounted on one of said manifold segments and having an inlet polymer flow passage in fluid communication with said polymer discharge flow passage of its associated manifold segment; and (ii) a nozzle mounted on said die body and having an inlet polymer flow passage in fluid communication with said inlet polymer flow passage of its associated die body for receiving the polymer melt and discharging a filament or filaments of the polymer melt therefrom.

12. The die assembly of claim 11, wherein said nozzles of each die module are arranged in a row, and each rotary positive displacement pump of each manifold segment includes a driven rotating member which rotates about an axis parallel to said row of nozzles.

13. The die assembly of claim 11, further including a recirculation module mounted on each manifold segment and having an inlet polymer flow passage in fluid communication with said polymer discharge flow passage of its associated manifold segment.

14. The die assembly of claim 13, wherein the assembly further includes a passage for recirculating the polymer melt from said recirculation module to a means for delivering polymer melt to said inlet polymer flow passage of each manifold segment.

15. A die assembly for operating a selectable number of die modules and a corresponding number of recirculation modules respectively configured for operation by a die module pneumatic controller and a recirculation module pneumatic controller, the die assembly comprising:

(a) a plurality of manifold segments corresponding to the selectable number of die modules, said manifold segments being interconnected in side-by-side relationship, each manifold segment including:

(i) a polymer inlet flow passage in fluid communication with an adjacent manifold segment forming a continuous polymer flow passage;

(ii) a polymer discharge flow passage configured to provide a pressurized polymer melt to the die modules and the recirculation modules associated with the manifold segment;

(iii) a rotary positive displacement pump for receiving a polymer melt from said polymer inlet flow passage and discharging the pressurized polymer melt into said polymer discharge flow passage;

(iv) a first die module instrument air passage for one of the selectable number of die modules; and (v) a first recirculation module instrument air passage for one of the corresponding number of recirculation modules;

(b) a pair of end plates laterally closing the plurality of manifold segments, said pair of end plates configured to provide the polymer melt to said continuous polymer flow passage;

(c) a pump drive shaft extending through said manifold segments and connected to each rotary positive displacement pump to drive each pump and maintain operating pressure of the polymer melt within said manifold segments;

(d) a first input instrument air flow passage in gaseous communication with the other manifold segments to form a continuous instrument air input flow passage, said continuous instrument air input flow passage configured to provide instrument air to a die module pneumatic controller;

(e) a first exhaust instrument air flow passage in gaseous communication with the other manifold segments to form an exhaust instrument air continuous flow passage, said exhaust instrument air continuous flow passage configured to exhaust instrument air from the die module pneumatic controller;

(f) a second die module instrument air passage, said first and second die module instrument air passages each configured to be in gaseous communication between the die module pneumatic controller and a selected one of the die modules for selectively opening and closing the selected one of the die modules;

(g) a second input instrument air flow passage in gaseous communication with the other manifold segments to form a second continuous instrument air input flow passage, said second instrument air input flow passage configured to provide instrument air to a continuous recirculation module pneumatic controller;

(h) a second exhaust instrument air flow passage in gaseous communication with the other manifold segments to form a second exhaust instrument air continuous flow passage, said second exhaust instrument air continuous flow passage configured to exhaust instrument air from the recirculation module pneumatic controller;

(j) a second recirculation module instrument air passage, said first and second recirculation module instrument air passages each configured to be in gaseous communication between the recirculation module pneumatic controller and a selected one recirculation module for selectively opening and closing the recirculation module;

(k) a motor operably coupled to said shaft to drive said plurality of rotary positive displacement pumps;

(l) a die module mounted on each manifold segment and having an inlet polymer flow passage in fluid communication with said polymer discharge flow passage of its associated manifold segment; and (ii) a nozzle mounted on said die body and having an inlet polymer flow passage in fluid communication with said inlet polymer flow passage of its associated die body for receiving the polymer melt and discharging a filament or filaments of the polymer melt therefrom; and (m) a recirculation module comprising a die body mounted on each manifold segment, said die body having an inlet polymer flow passage in fluid communication with said polymer discharge flow passage of its associated manifold segment for receiving the polymer melt and discharging a recirculated polymer melt.

16. The die assembly of claim 15, further comprising:

a die module pneumatic controller operably coupled to each manifold segment for controlling the associated die module; and a recirculation module pneumatic controller operably coupled to each manifold segment for controlling the associated recirculation module.

17. The die assembly of claim 16, wherein each pneumatic controller comprises a solenoid valve.

* * * * *

UNITED STATES PATENT AND TRADEMARK OFFICE

CERTIFICATE OF CORRECTION

PATENT NO. : 6,296,463 B1
DATED : October 1, 2001
INVENTOR(S) : Martin A. Allen

It is certified that error appears in the above-identified patent and that said Letters Patent is hereby corrected as shown below:

Column 6,
Line 39, change "pistion" to -- piston --.
Line 40, change "5" to -- 4 -- and
Line 41, after "open" insert -- or close polymer flow port 59 as has been described in relation to piston --.

Column 7,
Line 21, delete "15".

Column 9,
Line 50, change "15a-din" to -- 15a-d in --.

Column 10,
Line 21, change "130a-10d" to -- 130a-d --.

Signed and Sealed this

Twenty-first Day of January, 2003

JAMES E. ROGAN
*Director of the United States Patent and Trademark Office*